(12) United States Patent
Mohammadi Gojani et al.

(10) Patent No.: US 10,540,952 B2
(45) Date of Patent: Jan. 21, 2020

(54) SOUND ABSORBING STRUCTURE INCLUDING NANOFIBERS

(71) Applicants: Maryam Mohammadi Gojani, Isfahan (IR); Mohammad Amani Tehran, Tehran (IR); Ali Akbar Gharehaghaji, Tehran (IR)

(72) Inventors: Maryam Mohammadi Gojani, Isfahan (IR); Mohammad Amani Tehran, Tehran (IR); Ali Akbar Gharehaghaji, Tehran (IR)

(*) Notice: Subject to any disclaimer, the term of this patent is extended or adjusted under 35 U.S.C. 154(b) by 0 days.

(21) Appl. No.: 15/473,069

(22) Filed: Mar. 29, 2017

(65) Prior Publication Data

US 2017/0200441 A1    Jul. 13, 2017

Related U.S. Application Data

(60) Provisional application No. 62/315,106, filed on Mar. 30, 2016.

(51) Int. Cl.
| | |
|---|---|
| *G10K 11/168* | (2006.01) |
| *B32B 5/02* | (2006.01) |
| *B32B 27/06* | (2006.01) |
| *B32B 5/18* | (2006.01) |

(52) U.S. Cl.
CPC .......... *G10K 11/168* (2013.01); *B32B 5/022* (2013.01); *B32B 5/024* (2013.01); *B32B 5/026* (2013.01); *B32B 5/028* (2013.01); *B32B 5/18* (2013.01); *B32B 27/06* (2013.01); *B32B 2307/10* (2013.01); *B32B 2309/105* (2013.01)

(58) Field of Classification Search
CPC ....... G10K 11/168; B32B 3/266; B32B 5/022; B32B 5/024; B32B 5/026; B32B 5/028; B32B 5/04; B32B 5/18; B32B 5/245; B32B 7/12; B32B 9/007; B32B 9/041; B32B 9/042; B32B 9/046; B32B 9/047; B32B 9/06; B32B 15/043; B32B 15/046; B32B 15/10; B32B 15/12; B32B 15/14; B32B 15/18; B32B 15/20; B32B 21/10; B32B 27/06; B32B 29/02
USPC ........................................................ 181/294
See application file for complete search history.

(56) References Cited

U.S. PATENT DOCUMENTS

| | | | |
|---|---|---|---|
| 7,757,811 B2 | 7/2010 | Fox et al. | |
| 8,496,088 B2* | 7/2013 | Kitchen | B32B 5/26 |
| | | | 181/290 |
| 2006/0254855 A1* | 11/2006 | Loftus | E04B 1/84 |
| | | | 181/293 |
| 2008/0173497 A1* | 7/2008 | Kalinova | B32B 5/02 |
| | | | 181/290 |
| 2009/0176112 A1* | 7/2009 | Kruckenberg | B82Y 30/00 |
| | | | 428/457 |
| 2010/0175362 A1 | 7/2010 | Stranska | |

(Continued)

FOREIGN PATENT DOCUMENTS

| | | | | |
|---|---|---|---|---|
| DE | 3402967 A1 * | 8/1985 | .......... | E04B 1/8227 |
| WO | 2014111067 A2 | 7/2014 | | |

*Primary Examiner* — Forrest M Phillips
(74) *Attorney, Agent, or Firm* — Bajwa IP Law Firm; Haris Zaheer Bajwa

(57) ABSTRACT

Disclosed herein is a sound absorbing structure which includes at least one sound-permeable nanofiber layer and at least one sound absorbing layer; in which, the sound-permeable nanofiber layer is placed alongside of the sound absorbing layer.

23 Claims, 15 Drawing Sheets

(56) References Cited

U.S. PATENT DOCUMENTS

| | | | |
|---|---|---|---|
| 2012/0178332 A1 | 7/2012 | Uchida et al. | |
| 2012/0251925 A1* | 10/2012 | Sasaki | D01D 5/0038 |
| | | | 429/530 |
| 2013/0133980 A1* | 5/2013 | Pourdeyhimi | D01F 6/00 |
| | | | 181/294 |
| 2014/0216847 A1* | 8/2014 | Blinkhorn | B32B 5/26 |
| | | | 181/294 |
| 2015/0204066 A1* | 7/2015 | Kim | G10K 11/162 |
| | | | 181/294 |
| 2016/0289865 A1* | 10/2016 | Park | D01D 4/00 |

* cited by examiner

SOUND ABSORBING STRUCTURE INCLUDING NANOFIBERS

CROSS REFERENCE TO RELATED APPLICATION

This application claims the benefit of priority from U.S. Provisional Patent Application No. 62/315,106, filed on Mar. 30, 2016, and entitled "HYBRID NANO/MICRO-FIBROUS MULTILAYER SOUND ABSORBER AND METHOD FOR PRODUCING SAME," which is incorporated herein by reference in its entirety

TECHNICAL FIELD

The present disclosure generally relates to the field of sound absorption, particularly to a sound absorbing structure having a nanofiber layer, and more particularly to a method for fabricating the sound absorbing structure having a nanofiber layer.

BACKGROUND

High sound levels are known to have adverse effects including uncontrolled high and low frequency sound being a threat to health and well-being. The design of a sound absorbing material, suitable for a particular application, is based on a range of frequencies of unwanted sound, which is to be absorbed or damped.

Sound absorption is generally enhanced by increasing the mass of sound absorbers. However, using massive sound absorbers, leads to an increase in either weight or thickness of the sound absorbers, which would not be operable in many places that have space or weight restrictions. Hence, thin and light sound absorbers are desired in many circumstances.

In the world of acoustics, low frequency sounds are difficult to control due to their long wavelengths. Also, with sufficient power, low frequency sounds will pass through just about anything. Accordingly, since the absorption of lower frequency sounds is problematic, there is a need in the art to provide a sound absorbing structure to absorb low frequencies as well as high frequencies, while maintaining a minimum thickness and weight for the sound absorbing structure.

SUMMARY

In one general aspect, the present disclosure describes a sound absorbing structure which includes at least one sound-permeable nanofiber layer, and at least one sound absorbing layer; in which, the sound-permeable nanofiber layer is placed attached to the sound absorbing layer.

According to some exemplary implementations, the sound absorbing structure may include at least one sound-permeable nanofiber layer with first patterns, and at least one sound absorbing layer attached to the at least one sound-permeable nanofiber layer; and a patterned member placed attached to the one sound absorbing layer opposite the at least one sound-permeable nanofiber layer. The patterned member may include second patterns that corresponds to first patterns of the at least one sound-permeable nanofiber layer, and the patterned member may include one of a reticulated pattern, a spotted pattern, a perforated pattern, and a stapled pattern.

In Embodiments, the patterned member may be made of an electrical conductive material that is selected from the group consisting of a metal material, a semi-conductor material, a non-metal material, and combinations thereof. The electrical conductive material of the patterned member can be for example, aluminum, iron, copper, silicon, germanium, graphite, and combinations thereof.

According to some exemplary implementations, the sound-permeable nanofiber layer may include a patterned porosity, a random porosity, and combinations thereof and the patterned porosity or random porosity is selected from the group consisting of a perforated porosity, a spotted porosity, a stapled porosity, and a reticulated porosity, and combinations thereof.

According to some exemplary implementations, the sound-permeable nanofiber layer may have a thickness of at least 1 nanometer; and the sound-permeable nanofiber layer may include nanofibers with a diameter of at least 1 nanometer. Also, the sound-permeable nanofiber layer has a material that is selected from the group consisting of polymers, ceramics, nanostructures, metals, and combinations thereof.

According to some exemplary implementations, the polymers may include natural polymers, artificial polymers, copolymers, polyacrylonitrile (PAN), polyamide, polyester, polyethylene terephthalate (PET), cellulose acetate, Nylon 6 (PA6), Nylon 6-6, polyurethane (PU), polycarbonate (PC), polyvinyl alcohol (PVA), poly lactic acid (PLA), polyethylene oxide (PEO), polystyrene (PS), polyethylene methacrylate (PMMA), polyvinyl phenol (PVP), polyvinyl chloride (PVC), cellulose acetate (CA), PLGA, collagen, poly caprolactone (PCL), poly caprolactam, silicon rubber, and combinations thereof; and the nanostructures may include carbon nanotube (CNT), nanoclay, nanosilica, titanium dioxide, iron(III) oxide, graphene oxide nanoparticles, gold nanoparticles, silver nanoparticles, and combinations thereof.

According to some exemplary implementations, the ceramics may include oxides, nitrides, carbides, and combinations thereof; also, the metals may include silver, gold, iron, tungsten, and combinations thereof.

According to some exemplary implementations, the nanofibers may have a cross section that is selected from the group consisting of circular, trilobal, pentalobal, octalobal, elliptical, semicircular, core and shelf, porous, dumbbell-shaped, hollow fibers, diamond-shaped, and combinations thereof.

According to some exemplary implementations, the sound absorbing layer may be made of a material that may be selected from the group consisting of rock wool, glass wool, foam, cloth, paper, wood, metal, and combinations thereof also, the sound absorbing layer has a structure that may include a non-woven fabric, a woven fabric, a knitted fabric, a spun-bonded fabric, a melt-blown fabric, a needle-punched fabric, an apertured web, a split film web, a hydro-entangled web, an adhesive-backed web, an air-laid staple fiber web, an elastic fabric web, a mesh, a porous web, and combinations thereof.

In another aspect of exemplary embodiments of the present disclosure, a method for fabricating a sound absorbing structure having a sound-permeable nanofiber layer with a patterned porosity is disclosed. The method may include the steps of: providing a sound absorbing layer, placing a patterned member along one side of the sound absorbing layer, and depositing a plurality of nanofibers on the sound absorbing layer or on the patterned member to fabricate the sound absorbing structure.

According to other exemplary implementations, the sound-permeable nanofiber layer may be produced through a process, which may include electrostatic spinning, force spinning, phase separation, flash spinning, self-assembly, template synthesis, sol-gel, matrix/fibril, wet spinning, interfacial spinning, electrospinning, and combinations thereof.

According to an exemplary implementation, the plurality of nanofibers may be synthesized through an electrostatic spinning process, which may include bubble electrospinning, melt electrospinning, magnetic electrospinning, nozzle-less electrospinning, centrifugal electrospinning, coaxial electrospinning, classic electrospinning, gas jacket electrospinning, continuous electrospinning, and combinations thereof.

In another aspect of exemplary embodiments of the present disclosure, a method for fabricating a sound absorbing structure having a sound-permeable nanofiber layer is disclosed. The method may include the steps of: providing a sound absorbing layer, depositing a plurality of nanofibers on the sound absorbing structure to form a nanofiber layer, and increasing the sound permeability of the nanofiber layer to fabricate the sound absorbing structure.

According to exemplary implementations, the sound-permeable nanofiber layer may be produced through a process, which may include electrostatic spinning, force spinning, phase separation, flash spinning, self-assembly, template synthesis, sol-gel, matrix/fibril, wet spinning, interfacial spinning, electrospinning, and combinations thereof.

According to an exemplary implementation, the plurality of nanofibers may be synthesized through an electrostatic spinning process, which may include bubble electrospinning, melt electrospinning, magnetic electrospinning, nozzle-less electrospinning, centrifugal electrospinning, coaxial electrospinning, classic electrospinning, gas jacket electrospinning, continuous electrospinning, and combinations thereof.

According to some exemplary implementations, the sound permeability of the nanofiber layer may be increased during the nanofiber layer formation, after the nanofiber layer formation, and combinations thereof. The sound permeability of the nanofiber may be increased after the formation of the nanofiber layer through a process which may be selected from the group consisting of using an ultrasonic device, using a laser light radiation device, and combinations thereof.

According to some exemplary implementations, the sound permeability of the nanofiber may be increased during the formation of the nanofiber layer through a process which may include formation of the nanofiber layer with two different types of nanofibers and subsequently removing one type of the nanofibers, formation of the nanofiber layer in a three-dimensional manner by using nanoparticles and micro particles, formation of the nanofiber layer by using nanofibers with different diameters, salt bleaching method, collecting the synthesized nanofibers far away each other, and combinations thereof.

DETAILED DESCRIPTION

One of the solutions for absorbing low frequency sounds, and increasing the sound absorption coefficient is to use a structure that works based on the resonance principle, in which, by resonance of some elements of the resonator structure, the acoustic energy may be transferred into a thermal energy, and subsequently, the sound absorption coefficient of all frequencies may be increased, especially in low frequency sounds.

The nanofiber layers may be used as resonators to absorb low frequency sounds; however, using the nanofiber layers along with other sound absorbers may decrease the sound absorption coefficient of the whole structure due to the low sound permeability and reflective behavior of the nanofiber layer.

Exemplary embodiments consistent with the present disclosure allow for fabrication of a sound absorbing structure, which may be able to absorb both low and high frequency sounds, without increasing the thickness of the sound absorbers. This may be done utilizing a combination of at least one sound-permeable nanofiber layer as a resonator and at least one sound absorbing layer to serve as the sound absorbing structure.

As used herein, the "sound-permeable nanofiber layer" refers to a nanofiber layer that has sound absorption and sound transmission characteristics enabling the nanofiber layer to be a sound absorbent for a wide range of sound frequencies including low and high frequencies.

Figure 1:
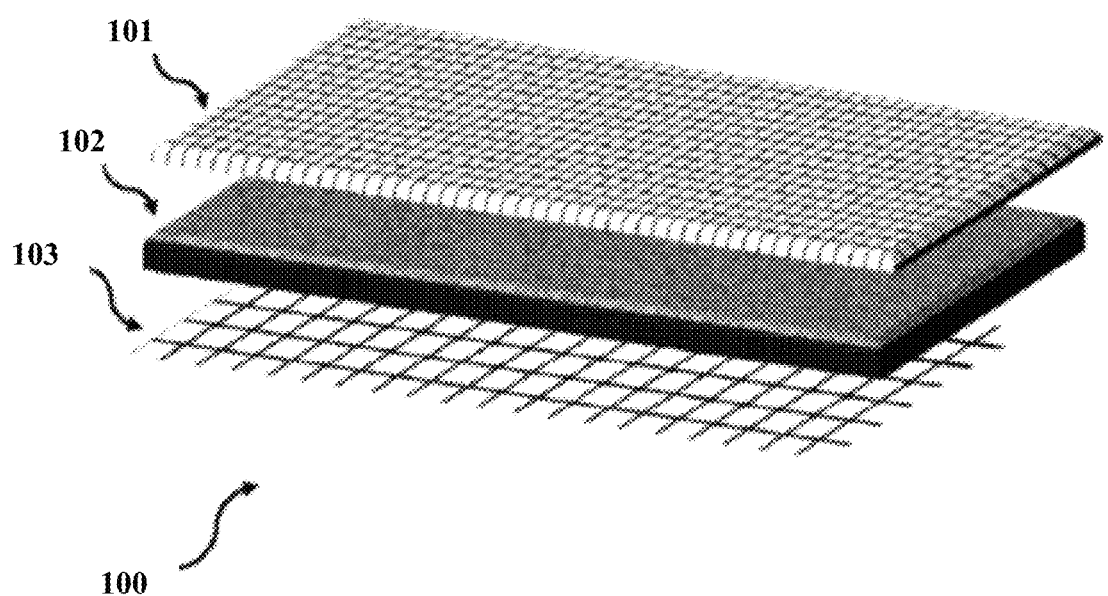
FIG. 1 is a sound absorbing structure, consistent with exemplary embodiments of the present disclosure.

FIG. 1 is a sound absorbing structure 100, consistent with exemplary embodiments of the present disclosure, which may be configured to absorb sounds with broadband frequencies. Referring to FIG. 1, the sound absorbing structure 100 may include at least one sound-permeable nanofiber layer with a patterned porosity 101, and at least one sound absorbing layer 102, in which the sound-permeable nanofiber layer with the patterned porosity 101 may be placed alongside of the sound absorbing layer 102.

The sound absorbing structure 100 may further include a patterned member 103, which forms the corresponding patterned porosity in the sound-permeable nanofiber layer during the production process; therefore, the patterned porosity results in high sound permeability of the sound-permeable nanofiber layer. The patterned member may refer to any electrical conductive elements, objects, or structures that may have a plurality of openings or slots, arranged in a specific pattern. The patterned member may have a pattern that is selected from a group consisting of a reticulated pattern, a spotted pattern, a perforated pattern, a stapled pattern, and combinations thereof.

Also, the patterned member may have an electrical conductive material that is selected from a group consisting of a metal material, a semi-conductor material, a non-metal material, and combinations thereof. The electrical conductive material of the patterned member may be aluminum, iron, copper, silicon, germanium, graphite, or combinations thereof.

In exemplary embodiments, patterned member 103 may be an electrical conductive member which may be used as a substrate during the electrospinning process and it directs the electrical field to form a patterned shape because of its electrical conductivity. Accordingly, the electrospun nanofibers which have a positive charge may be attracted to the substrate with a negative charge, leading to them being placed on the substrate in a patterned configuration of the patterned member due to the presence of the patterned member onto the substrate or at the bottom of the substrate. Therefore, in exemplary embodiments, patterned member 103 may correspond to and causes patterned porosity of the nanofiber layer during the electrospinning process.

Position of the patterned member 103 may be along one side of the sound absorbing layer 102. The patterned member 103 may be removed from the sound absorbing structure after fabrication of the sound absorbing structure.

The patterned member 103 may be an electrical conductive member which directs the electrical field to form a patterned configuration because of its electrical conductivity; therefore, the electrospun nanofibers which have a positive charge are attracted to the substrate with a negative charge, and they may be placed on the substrate in a patterned configuration of the patterned member due to the presence of the patterned member onto the substrate or at the bottom of that, which make change the electrical field to a patterned form. So as explained above, the patterned member corresponds and causes the patterned porosity of the nanofiber layer during the electrospinning process.

Referring again to FIG. 1, the patterned member 103 may be placed below the sound absorbing layer 102, and during the electrospinning process, it may direct the electric field in a patterned directions for depositing the electrospun nanofibers over the sound absorbing layer in a patterned orientation.

The sound-permeable nanofiber layer with a patterned porosity 101 may have a thickness of at least about 1 nanometer. The patterned porosity of the sound-permeable nanofiber layer 101 may be in a form of porosity that is selected from a group consisting of a perforated porosity, a spotted porosity, a stapled porosity, and reticulated porosity, and combinations thereof.

Also, the sound-permeable nanofiber layer 101 may include nanofibers with a diameter of at least 1 nanometer. The nanofibers of the sound-permeable nanofiber layer 101 may include polymers, ceramics, nanostructures, metals, and combinations thereof.

The polymers may be selected from the group consisting of natural polymers, artificial polymers, copolymers, polyacrylonitrile (PAN), polyamide, polyester, polyethylene terephthalate (PET), cellulose acetate, Nylon 6 (PA6), Nylon 6-6, polyurethane (PU), polycarbonate (PC), polyvinyl alcohol (PVA), poly lactic acid (PLA), polyethylene oxide (PEO), polystyrene (PS), polyethylene methacrylate (PMMA), polyvinyl phenol (PVP), polyvinyl chloride (PVC), cellulose acetate (CA), PLGA, collagen, poly caprolactone (PCL), poly caprolactam, silicon rubber, and combinations thereof.

Also, the nanostructures may be selected from the group consisting of carbon nanotube (CNT), nanoclay, nanosilica, titanium dioxide, iron (III) oxide, graphene oxide nanoparticles, gold nanoparticles, silver nanoparticles, and combinations thereof. The ceramics may include oxides, nitrides, carbides, and combinations thereof. The ceramics can be for example, alumina, zirconia, silicon dioxide, biodegradable ceramics, hydroxyl apatite, and combinations thereof. Also, the metals may include silver, gold, iron, tungsten, and combinations thereof.

Furthermore, the nanofibers may have a cross section, and may be selected from the group consisting of circular, trilobal, pentalobal, octalobal, elliptical, semicircular, core and shelf, porous, dumbbell-shaped, hollow fibers, diamond-shaped, and combinations thereof.

The sound absorbing layer 102 may have a thickness of at least about 1 nanometer; and it may be made of a material that may be selected from the group consisting of rock wool, glass wool, foam, cloth, paper, wood, metal, and combinations thereof. Also, the sound absorbing layer 102 may have a structure that may be one of a non-woven fabric, a woven fabric, a knitted fabric, a spun-bonded fabric, a melt-blown fabric, a needle-punched fabric, an apertured web, a split film web, a hydro-entangled web, an adhesive-backed web, an air-laid staple fiber web, an elastic fabric web, a mesh, a porous web, or combinations thereof.

Figure 2:
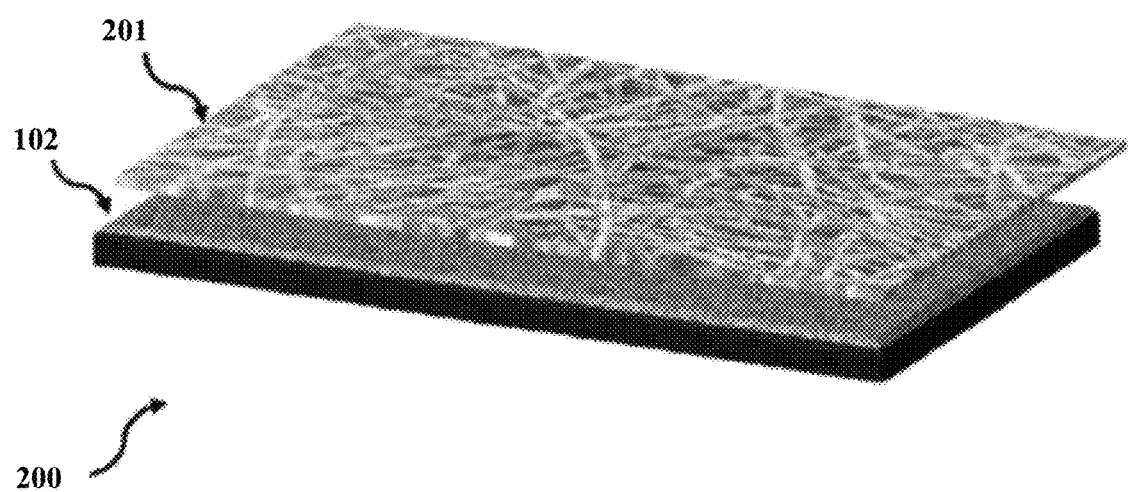
FIG. 2 is a sound absorbing structure, consistent with exemplary embodiments of the present disclosure.

FIG. 2 is a sound absorbing structure 200, consistent with exemplary embodiments of the present disclosure, which may be configured to absorb sounds with broadband frequencies. Referring to FIG. 2, the sound absorbing structure 200 may include at least one sound-permeable nanofiber layer with a random porosity 201, and at least one sound absorbing layer 102 which may be placed attached to the sound-permeable nanofiber layer.

The random porosity of the sound-permeable nanofiber layer 201 may be in a form of porosity that is selected from a group consisting of a perforated porosity, a spotted porosity, a stapled porosity, and reticulated porosity, and combinations thereof. Also, the random porosity may be the result of increasing the space between the nanofibers.

The sound-permeable nanofiber layer 201 may have a thickness of at least about 1 nanometer. Also, the sound-permeable nanofiber layer 201 may include fibers with a diameter of at least 1 nanometer. The sound-permeable nanofiber layer 201 may include polymers, ceramics, nanostructures, metals, and combinations thereof.

The polymeric nanofiber may be one of natural polymers, artificial polymers, copolymers, polyacrylonitrile (PAN), polyamide, polyester, polyethylene terephthalate (PET), cellulose acetate, Nylon 6 (PA6), Nylon 6-6, polyurethane (PU), polycarbonate (PC), polyvinyl alcohol (PVA), poly lactic acid (PLA), polyethylene oxide (PEO), polystyrene (PS), polyethylene methacrylate (PMMA), polyvinyl phenol (PVP), polyvinyl chloride (PVC), cellulose acetate (CA), PLGA, collagen, poly caprolactone (PCL), poly caprolactam, silicon rubber, or combinations thereof.

Also, the nanostructures may be one of carbon nanotube (CNT), nanoclay, nanosilica, titanium dioxide, iron (III) oxide, graphene oxide nanoparticles, gold nanoparticles, silver nanoparticles, or combinations thereof. The ceramics may include oxides, nitrides, carbides, and combinations thereof. The ceramics can be for example, alumina, zirconia, silicon dioxide, biodegradable ceramics, hydroxyl apatite, or combinations thereof. Also, the metals may include silver, gold, iron, tungsten, or combinations thereof.

Furthermore, the nanofibers may have a cross section, which may be selected from the group consisting of circular, trilobal, pentalobal, octalobal, elliptical, semicircular, core and shelf, porous, dumbbell-shaped, hollow fibers, diamond-shaped, and combinations thereof.

The sound absorbing layer 102 may have a thickness of at least about 1 nanometer; and it is made of a material that may be selected from the group consisting of rock wool, glass wool, foam, cloth, paper, wood, metal, and combinations thereof.

Also, the sound absorbing layer 102 has a structure that may be selected from the group consisting of a non-woven fabric, a woven fabric, a knitted fabric, a spun-bonded fabric, a melt-blown fabric, a needle-punched fabric, an apertured web, a split film web, a hydro-entangled web, an adhesive-backed web, an air-laid staple fiber web, an elastic fabric web, a mesh, a porous web, and combinations thereof.

Figure 3A:
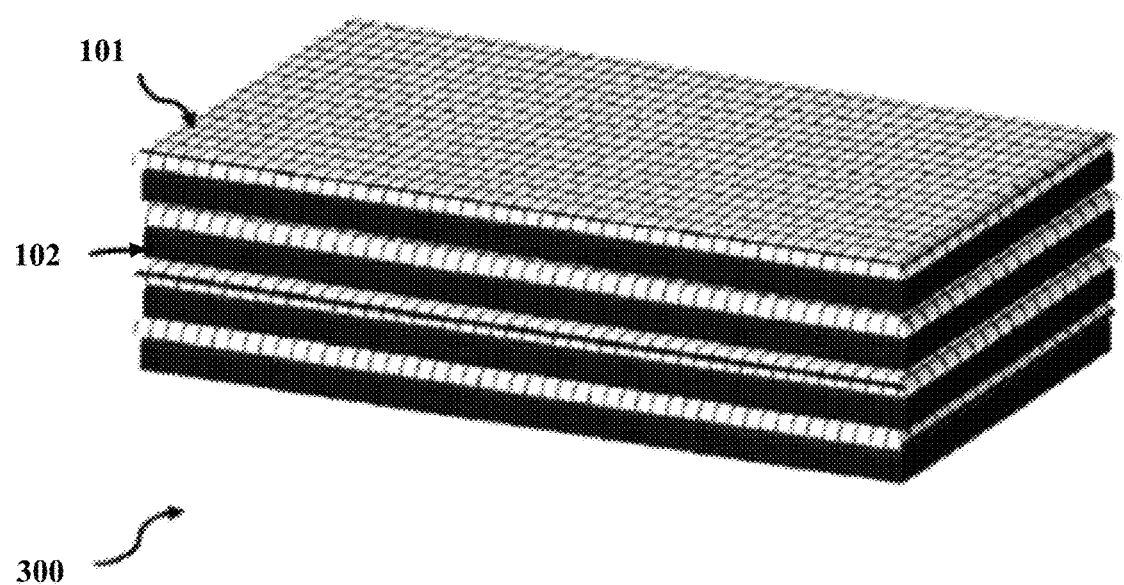
FIG. 3A is a sound absorbing structure, consistent with exemplary embodiments of the present disclosure.

FIG. 3A illustrates a sound absorbing structure 300, consistent with exemplary embodiments of the present disclosure. Referring to FIG. 3A, the sound absorbing structure 300 may include multiple repeats of a combination of a sound-permeable nanofiber layer with a patterned porosity 101, and a sound absorbing layer 102, which may be placed attached to the sound-permeable nanofiber layer.

Figure 3B:
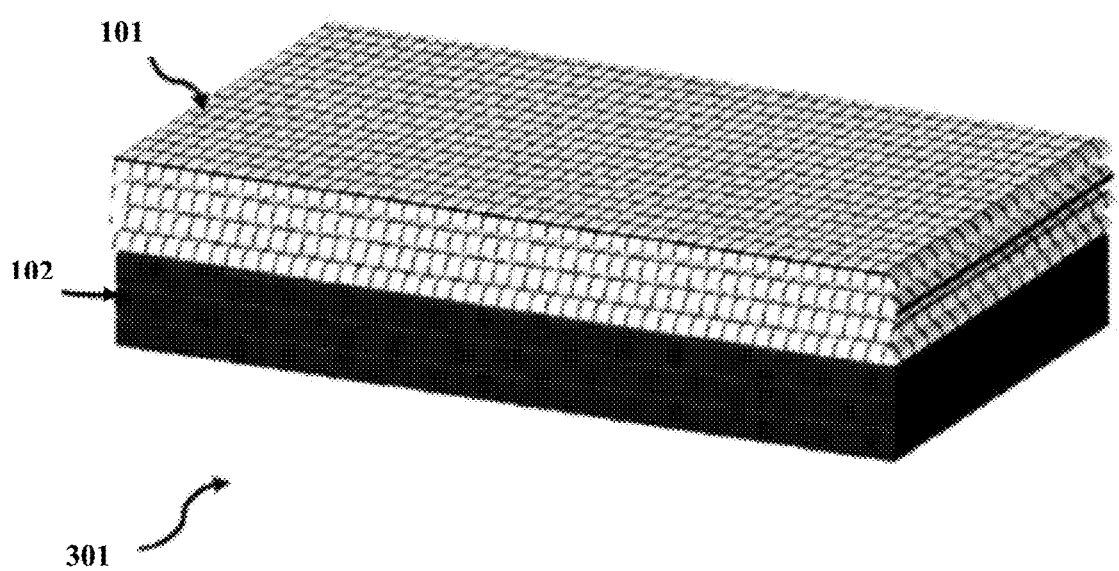
FIG. 3B is a sound absorbing structure, consistent with exemplary embodiments of the present disclosure.

FIG. 3B illustrates a sound absorbing structure 301, consistent with exemplary embodiments of the present disclosure. Referring to FIG. 3B, the sound absorbing structure 301 may include a plurality of sound-permeable nanofiber layers with a patterned porosity 101, and a plurality of sound absorbing layer 102 which may be placed alongside the sound-permeable nanofiber layer.

Figure 4:
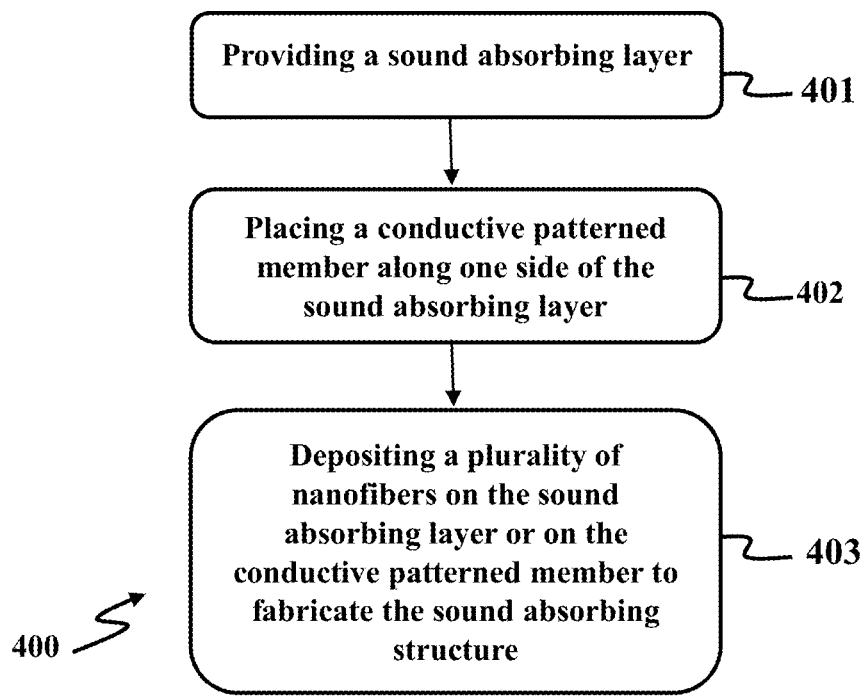
FIG. 4 illustrates a method for fabricating a sound absorbing structure having a sound-permeable nanofiber layer with a patterned porosity, consistent with exemplary embodiments of the present disclosure.

FIG. 4 illustrates a method for fabricating a sound absorbing structure, having a sound-permeable nanofiber layer with a patterned porosity, consistent with exemplary embodiments of the present disclosure. Method 400 may include the steps of: providing a sound absorbing layer (401), placing a patterned member along one side of the sound absorbing layer (402), and depositing a plurality of nanofibers on the sound absorbing layer to fabricate the sound absorbing structure (403). Method 400 may further include removing the patterned member from the fabricated sound absorbing structure.

In step 401, in an exemplary implementation, a sound absorbing layer, with a thickness of at least about 1 nanometer may be provided. The sound absorbing layer may be made of a material that may be selected from the group consisting of rock wool, glass wool, foam, cloth, paper, wood, metal, and combinations thereof.

Also, the sound absorbing layer may have a structure that may be selected from the group consisting of a non-woven fabric, a woven fabric, a knitted fabric, a spun-bonded fabric, a melt-blown fabric, a needle-punched fabric, an apertured web, a split film web, a hydro-entangled web, an adhesive-backed web, an air-laid staple fiber web, an elastic fabric web, a mesh, a porous web, and combinations thereof.

In step 402, a patterned member may be placed along one side of the sound absorbing layer. The patterned member may refer to any electrical conductive elements, objects, or structures that may have a plurality of openings or slots, arranged in a specific pattern; also, the patterned member is configured to form the corresponding patterned porosity in the sound-permeable nanofiber layer during the fabrication process; therefore, the patterned porosity results in high sound permeability of the sound-permeable nanofiber layer. The patterned member may have a pattern, which may be selected from the group consisting of a reticulated pattern, a spotted pattern, a perforated pattern, a stapled pattern and combinations thereof.

In step 403, a plurality of nanofibers may be deposited on the sound absorbing layer or on the electrical conducive patterned member to form a sound-permeable nanofiber layer with a patterned porosity and to fabricate the sound absorbing structure. The nanofibers may be fabricated through a process which is selected from the group consisting of an electrostatic spinning process, force spinning, phase separation, flash spinning, self-assembly, template synthesis, sol-gel, matrix/fibril, wet spinning, interfacial spinning, and combinations thereof.

The nanofibers may be synthesized through an electrospinning process which may be selected from the group consisting of bubble electrospinning, melt electrospinning, magnetic electrospinning, nozzle less electrospinning, centrifugal electrospinning, coaxial electrospinning, classic electrospinning, gas jacket electrospinning, continuous electrospinning, and combinations thereof.

After producing the sound-permeable nanofiber layer with a patterned porosity, at least one sound-permeable nanofiber layer and at least one sound absorbing layer may be put together as a multilayer for using the fabricated sound absorbing structure for absorbing a wide range of sound frequencies.

Figure 5:
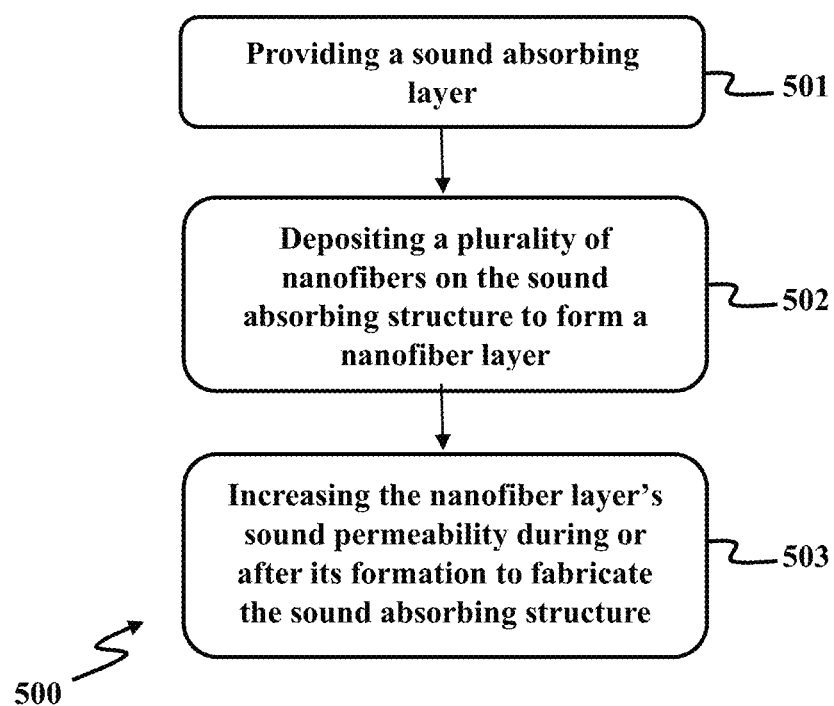
FIG. 5 illustrates a method for fabricating a sound absorbing structure having a sound-permeable nanofiber layer, consistent with exemplary embodiments of the present disclosure.

FIG. 5 illustrates a method for fabricating a sound absorbing structure, having a sound-permeable nanofiber layer, consistent with exemplary embodiments of the present disclosure. The method 500 may include the steps of: providing a sound absorbing layer (501), depositing a plurality of nanofibers on the sound absorbing structure to form a nanofiber layer (502), and increasing the sound permeability of the nanofiber layer to fabricate the sound absorbing structure (503).

In step 501, in an exemplary implementation, a sound absorbing layer, with a thickness of at least about 1 nanometer may be provided. The sound absorbing layer may be made of a material that may be selected from the group consisting of rock wool, glass wool, foam, cloth, paper, wood, metal, and combinations thereof.

Also, the sound absorbing layer may have a structure that may be from a group consisting of a non-woven fabric, a woven fabric, a knitted fabric, a spun-bonded fabric, a melt-blown fabric, a needle-punched fabric, an apertured web, a split film web, a hydro-entangled web, an adhesive-backed web, an air-laid staple fiber web, an elastic fabric web, a mesh, a porous web, and combinations thereof.

In step 502, a plurality of nanofibers may be deposited on the sound absorbing layer to form a nanofiber layer over the sound absorbing layer. The nanofibers may be deposited on the sound absorbing layer through a process which may be selected from the group consisting of an electrostatic spinning process, force spinning, phase separation, flash spinning, centrifugal spinning, self-assembly, sol-gel, matrix/fibril, template synthesis, wet spinning, interfacial spinning, and combinations thereof.

The nanofibers may be deposited on the sound absorbing layer through an electrospinning process which is selected from the group consisting of bubble electrospinning, melt electrospinning, magnetic electrospinning, nozzle less electrospinning, centrifugal electrospinning, coaxial electrospinning, classic electrospinning, gas-jacket electrospinning, continuous electrospinning, and combinations thereof.

In step 503, the sound permeability of the produced nanofiber layer may be increased during or after the production of the nanofiber layer by incorporating a plurality of random porosities into the nanofiber layer.

In order to incorporate a random porosity into the nanofiber layer during the production of the nanofiber layer, different methods may be used. One of the methods may be to synthesize two different types of nanofibers for production of the nanofiber layer, and subsequently removing one type of the nanofibers to incorporate the random porosity in the nanofiber layer.

The other methods for incorporate a random porosity into the nanofiber layer during the production of the nanofiber layer may include the production of a three-dimensional nanofiber layer with a random porosity by using different nanoparticles and micro particles during the production of the nanofiber layer, salt bleaching method, collecting the synthesized nanofibers far away each other, and combinations thereof. Also, for incorporating a random porosity into the nanofiber layer, nanofibers with different diameters and different materials may be used. In order to incorporate the random porosity into the nanofiber layer combinations of above-mentioned methods may be used.

Also, in order to incorporate a random porosity into the nanofiber layer after the production of the nanofiber layer, different methods may be used, which includes using an ultrasonic device for increasing the space between the nanofibers, incorporating a random porosity by using a laser light radiation device, incorporating a random porosity by using plasma particles, and combinations thereof.

After producing the sound-permeable nanofiber layer with a random porosity, at least one sound-permeable nanofiber layer and at least one sound absorbing layer may be put together as a multilayer for using the fabricated sound absorbing structure for absorbing a broad band sound frequencies.

EXAMPLES

Example 1: Fabricating a Sound Absorbing Structure

In this example, a sound absorbing structure including a rock wool layer as a sound absorbing layer and a sound-permeable PAN nanofiber layer with a patterned porosity was fabricated through the following steps. At first, a polyacrylonitrile (PAN) solution was prepared by dissolving 0.24 gram of the PAN polymer, with a molecular weight of about 150 kilo Dalton (kDa), in an amount of about 2 milliliter of dimethyl formamide (DMF) as a solvent to obtain a polymeric solution with a concentration of about 12% (weight/volume); thereafter, the solution was stirred for about 2 hours to form a homogenous solution.

After that, a sound-permeable PAN nanofiber layer was produced through an electrospinning process of the prepared PAN solution with the following parameters and by using an electrospinning apparatus having a nozzle. The PAN solution was pumped into a syringe of the electro spinneret with a diameter of about 1 millimeter and having a needle as a nozzle with a gauge of about 22, which has an inner diameter of about 0.4 millimeter, and an outer diameter of about 0.7 millimeter. Also, for maintaining the consistency of the electrospun nanofibers, the curvature at the tip of the needle was removed and its surface was flatten by using a sandpaper.

Afterward, a positive potential was applied to the needle of the syringe; and, an electrical conductive collecting plate with a diameter of about 10 centimeters was placed in a distance of about 18 centimeters horizontally from the needle of the electro spinneret as a negative electrode.

The electrospinning parameters were varied in order to synthesize the suitable PAN nanofibers; and finally, the electrospinning condition was determined at a feed rate of about 2 mL/hour, and a voltage of about 15 kilo Volt (kV). After that, in order to test the electrospinning parameters and to characterize the synthesized PAN nanofibers with the described electrospinning condition, the PAN nanofibers were synthesized in an electrospinning process; and after that, they were analyzed using a scanning electron microscope (SEM); and then, the diameters of the nanofibers was calculated using the Image J software.

Figure 6A:
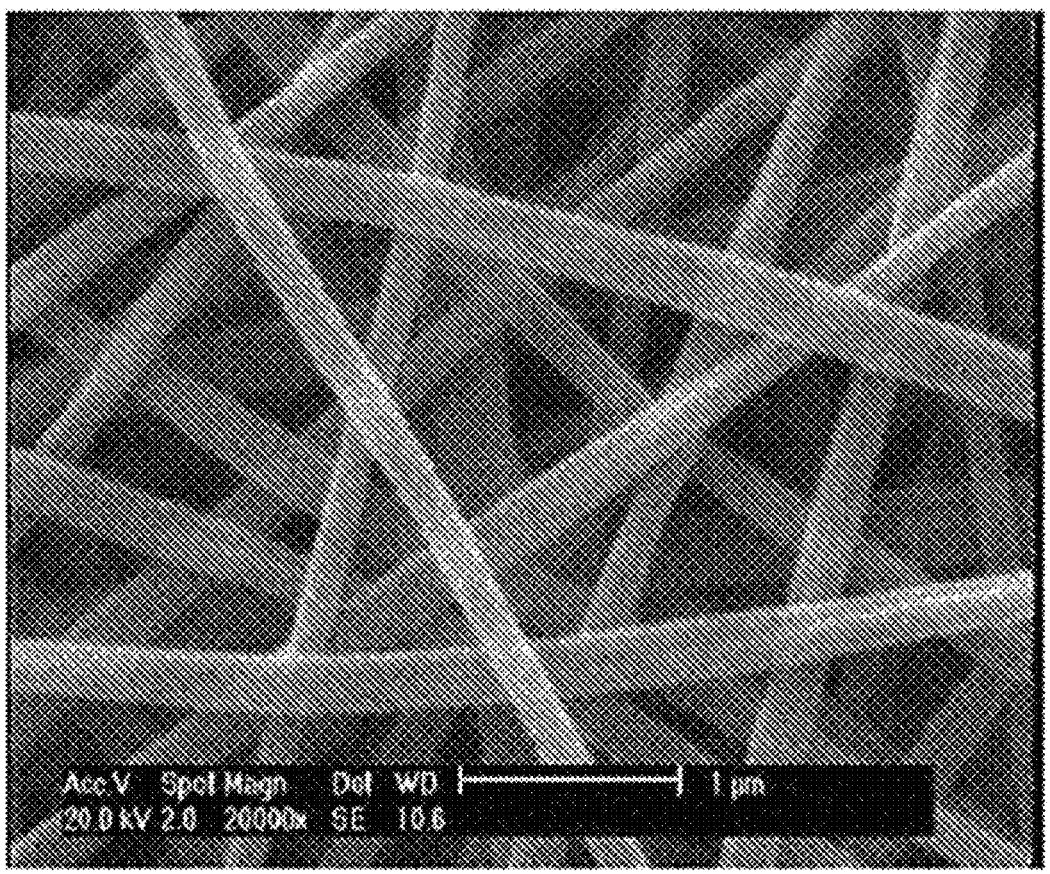
FIG. 6A illustrates the scanning electron microscope (SEM) image of one exemplary synthesized PAN nanofibers forming an exemplary nanofiber layer with a random porosity, consistent with exemplary embodiments of the present disclosure.
Figure 6B:
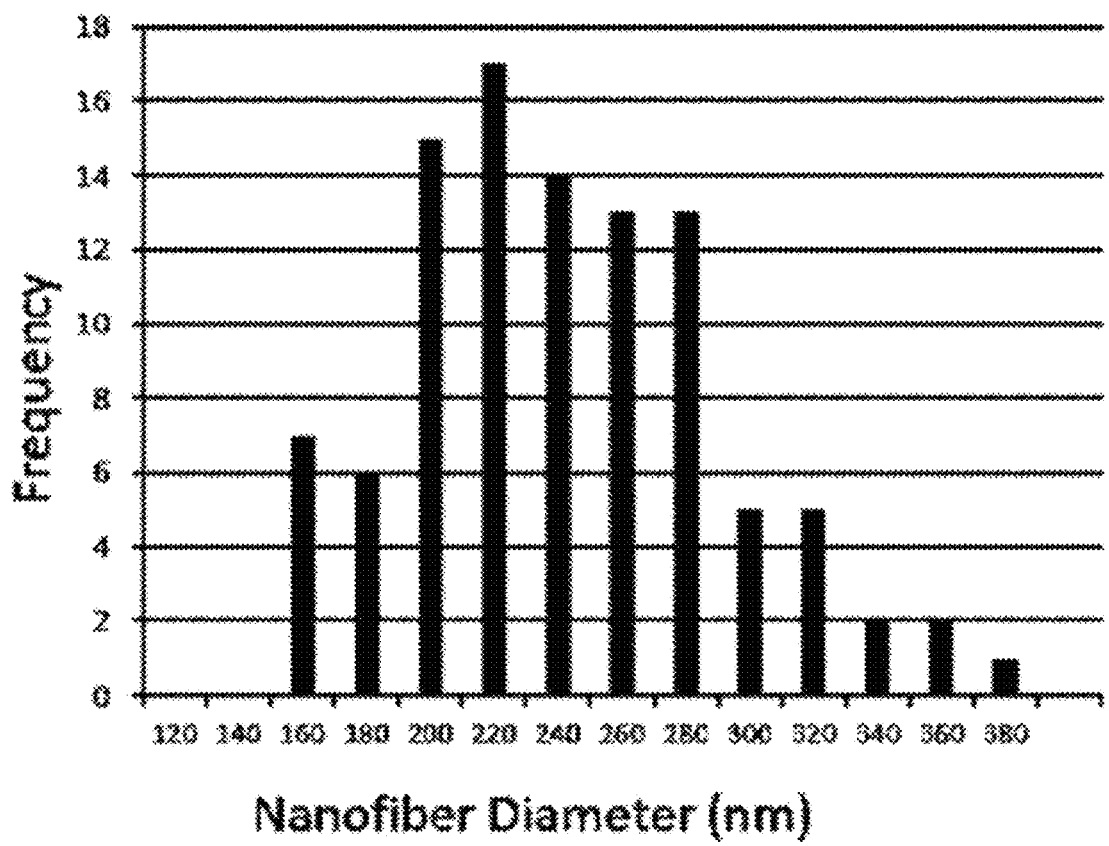
FIG. 6B illustrates diameter distribution of the synthesized PAN nanofibers, consistent with exemplary embodiments of the present disclosure.

FIG. 6A illustrates the SEM image of the resultant PAN nanofiber layer which make a nanofiber layer with a random porosity on the collecting plate; also, this nanofiber layer with a random porosity has an average porosity of about 66%. FIG. 6B shows the diameter distribution of the synthesized PAN nanofibers, which was measured from the SEM images. Referring to FIG. 6B, the mean diameter of synthesized PAN nanofibers is about 230 nanometers.

After determination of the electrospinning parameters, in order to produce the sound-permeable PAN nanofiber layer with a patterned porosity, an aluminum mesh with a length of about 20 centimeters, and a width of about 15 centimeters as a patterned member was placed on the surface of the collecting plate.

The aluminum mesh as a patterned member was configured to form corresponding patterns in the sound-permeable PAN nanofiber layer, which ultimately result in high sound permeability of the sound-permeable nanofiber layer. Two different aluminum meshes with densities of about 6 metal strands per centimeter as a low density mesh and 14 metal strands per centimeter as a high density mesh, with a strand diameter of about 500 micrometers were used.

The electrospinning process was done in a following condition. The PAN solution was pumped into a syringe of the electro spinneret, and it was fed through the electro spinneret at a feed rate of about 2 mL/hour. Also, the rotation of the electrical conductive collecting plate was started; and the feeding device was turned on. After that, the power supply was turned on by applying a voltage of about 15 kilo Volt (kV) between the needle of the electro spinneret as the positive electrode and the electrical conductive collecting plate as the negative electrode; and the electrospinning apparatus was started to synthesize the electrospun PAN nanofibers.

The resultant PAN nanofibers were collected on the aluminum mesh after 2.5 hours of electrospinning; thereafter, the aluminum mesh was removed from the sound-permeable PAN nanofiber layer with a patterned porosity. Removing the aluminum mesh was done in a gently manner in order to avoid tearing the sound-permeable PAN nanofiber layer, and maintaining the uniformity of density throughout the sound-permeable PAN nanofiber layer.

The total weight of the produced nanofiber layer was about 0.38 gr/m$^2$ after 2.5 hours of electrospinning. Also, the thickness of the sound-permeable PAN nanofiber layer was about 150 micrometers. The produced sound-permeable PAN nanofiber layer was analyzed by using a scanning electron microscope (SEM).

Figure 7A:
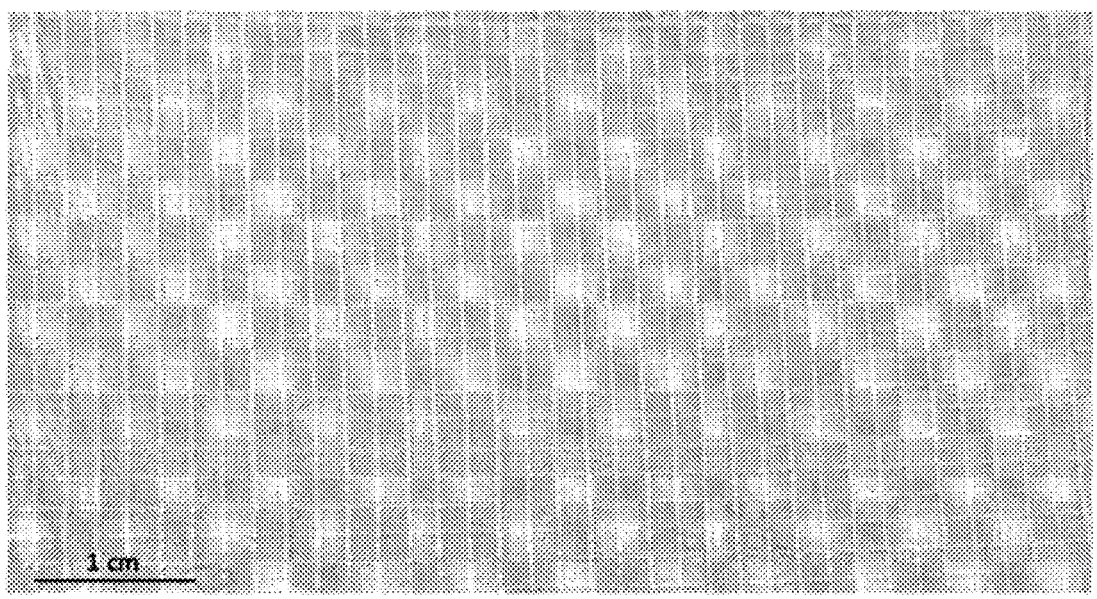
FIG. 7A illustrates an optical image of the sound-permeable PAN nanofiber layer with a patterned porosity, which was produced by using the aluminum mesh with a density of 6 metal strands per centimeter, consistent with exemplary embodiments of the present disclosure.

FIG. 7A shows an optical image of the sound-permeable PAN nanofiber layer with a patterned porosity which was produced by using the aluminum mesh as a patterned member with a density of 6 metal strands per centimeter. Referring to FIG. 7A, the aluminum mesh was not removed from the sound-permeable PAN nanofiber layer, and it is still behind the sound-permeable PAN nanofiber layer.

Figure 7B:
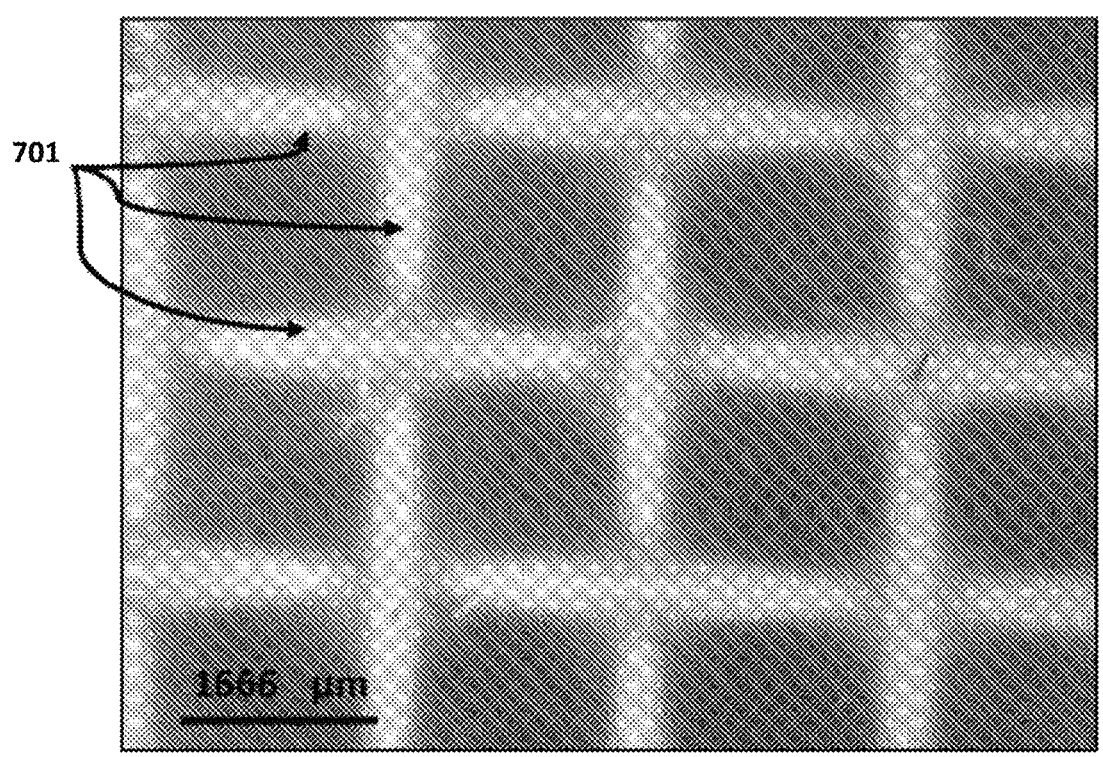
FIG. 7B illustrates a magnified optical image of the sound-permeable PAN nanofiber layer with a patterned porosity which was produced by using the aluminum mesh with a density of 6 metal strands per centimeter, consistent with exemplary embodiments of the present disclosure.

FIG. 7B shows a magnified image of the sound-permeable PAN nanofiber layer with a patterned porosity which was produced by using the aluminum mesh as a patterned member with a density of 6 metal strands per centimeter, complementary to FIG. 7A. Referring to FIG. 7B, the patterned porosity of the fragment of the sound-permeable PAN nanofiber layer is created by connecting the plurality of PAN nanofiber strands 701 in a patterned orientation.

Figure 8:
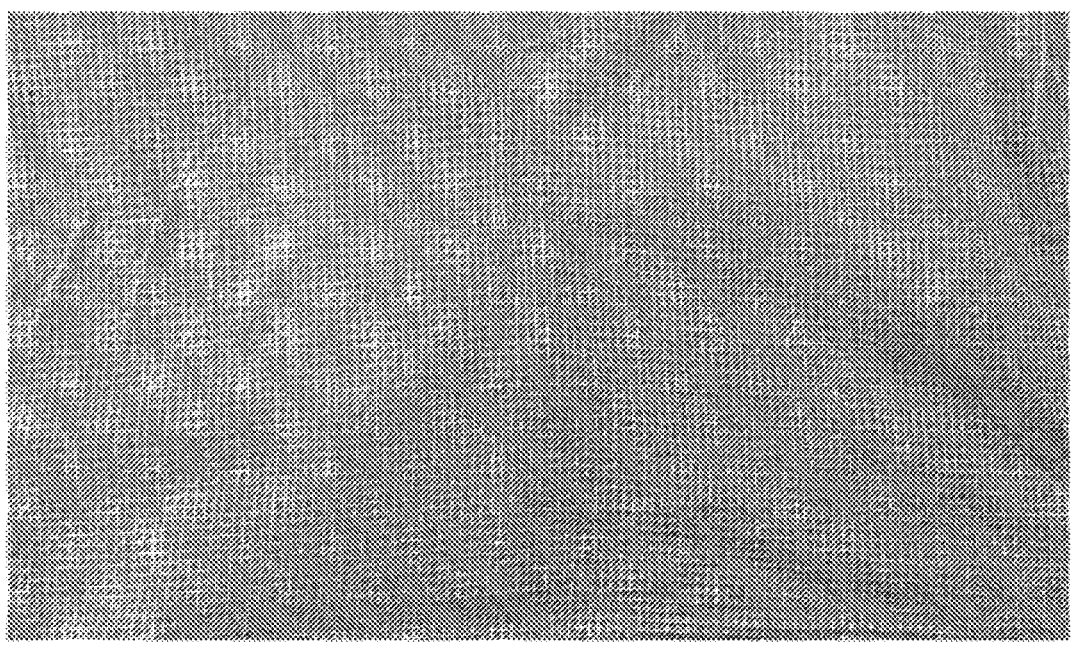
FIG. 8 illustrates an optical image of the sound-permeable PAN nanofiber layer with a patterned porosity which was produced by using the aluminum mesh with a density of 14 metal strands per centimeter, consistent with exemplary embodiments of the present disclosure.

FIG. 8 shows an optical image of the sound-permeable PAN nanofiber layer with a patterned porosity which was produced by using the aluminum mesh as a patterned member with a density of 14 metal strands per centimeter. Referring to FIG. 8, this sound-permeable PAN nanofiber layer has a higher density, due to the usage of an aluminum mesh with 14 strands per centimeter density, in compare to the sound-permeable PAN nanofiber layer of FIGS. 7A and 7B, which are produced by using an aluminum mesh with 6 strands per centimeter density.

Finally, the sound absorbing structure was fabricated by putting the sound-permeable PAN nanofiber layer along one side of the rock wool layer with a length of about 20 centimeters, a width of about 15 centimeters, and a thickness of about 1 centimeter. Also, the density of the rock wool was about 120 Kg/m$^3$.

Example 2: Determining the Sound Absorption Coefficient

In this example, the sound absorption coefficient of the fabricated exemplary sound absorbing structure according to Example 1 was measured by using the impedance tube BSWA-(SW422/SW477). The impedance tube with a diameter of 10 centimeters was used to measure the low frequency sounds absorption coefficient (for example between about 63 HZ to about 1600 HZ frequencies).

In order to determine the sound absorption coefficient of the fabricated sound absorbing structure which includes a sound-permeable PAN nanofiber layer and a rock wool layer, different test specimens with a diameter of 10 centimeter was provided from the fabricated sound absorbing structure. Each test specimen was placed in the specimen-receiving site of the impedance tube, while the surface area of each test specimen was equal to the cross sectional area of the impedance tube.

In order to perform the impedance tube sound absorption test, the test parameters were determined as follows. The temperature was about 25° C., and the pressure level was about 88.830 kilopascal (kPa). The humidity was about 12%, and the density of air was about 1 Kg/m$^3$. Also, the characteristic acoustic impedance of the air was about 353.835 Pa·s/m.

After that, by projecting sound pulses with a known frequency, a known pressure level toward the test specimen in the impedance tube, the low sound frequency absorbing coefficient for the sound absorbing structures was determined in each sound frequency. The results of the impedance tube sound absorption test were measured according to GB/T-18696, 2-2002 ISO standard.

Figure 9:
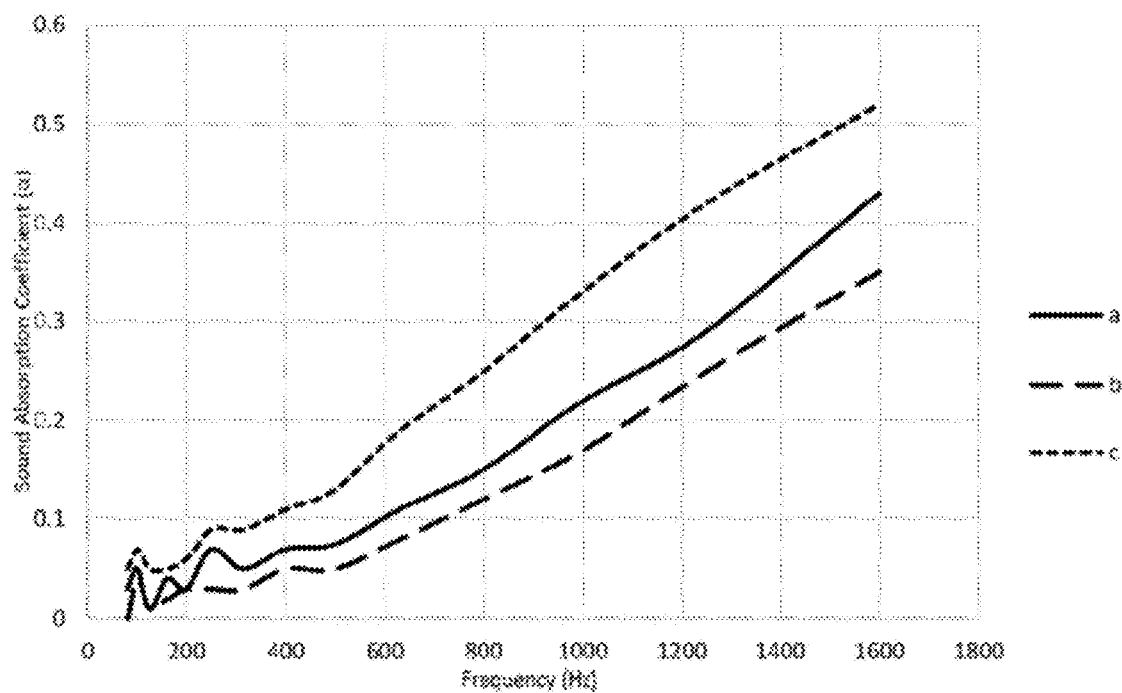
FIG. 9 illustrates a curve of the sound absorption coefficients versus the frequencies of three test specimens of sound absorbing structures: a rock wool layer with a thickness of 1 centimeter (designated by letter "a"), a rock wool layer with a thickness of 1 centimeter and a PAN nanofiber layer without porosity (designated by letter "b"), and a rock wool layer with a thickness of 1 centimeter and a sound-permeable PAN nanofiber layer with a patterned porosity (designated by letter "c"), according to one or more aspects of the present application, consistent with exemplary embodiments of the present disclosure.

FIG. 9 illustrates a curve of sound absorption coefficients versus the frequencies of three tested specimens of four different sound absorbing structures, including: a rock wool layer with a thickness of 1 centimeter (designated by letter "a"), a rock wool layer with a thickness of 1 centimeter and a PAN nanofiber layer without porosity (designated by letter "b"), and a rock wool layer with a thickness of 1 centimeter and a sound-permeable PAN nanofiber layer with a patterned porosity which is an exemplary sound absorbing structure according to one or more aspects of the present application (designated by letter "c").

Referring to FIG. 9, the rock wool layer with a thickness of 1 centimeter and the PAN nanofiber layer without porosity (b) in comparison with the rock wool layer with a thickness of 1 centimeter (a), has a lower sound absorption coefficient in all frequencies; therefore, it shows that the PAN nanofiber layer in the test specimen (b) works as a sound barrier and it prevents sounds to reach the rock wool layer of the test specimen (b); and subsequently, to be absorbed by the rock wool layer of the test specimen (b).

As a result, the sound absorption coefficient of the test specimen (b), which includes the rock wool layer with a thickness of 1 centimeter and the PAN nanofiber layer without porosity, is lower than the test specimen (a), which includes the rock wool layer with a thickness of 1 centimeter.

Referring again to FIG. 9, the test specimen (c) has an average coefficient of sound absorption of about 0.0778 in a frequency band between 0 HZ and 500 HZ; while the test specimen (a) has an average coefficient of sound absorption of about 0.047 in a frequency band between about 0 HZ and about 500 HZ.

Also, the test specimen (c) has an average coefficient of sound absorption of about 0.342 in a frequency band between 500 HZ and 1800 HZ; while the test specimen (a) has an average coefficient of sound absorption of about 0.24 in a frequency band between 500 HZ and 1800 HZ. Moreover, the test specimen (c) has an average coefficient of sound absorption of about 0.621 in a frequency band more than 1800 HZ; while the test specimen (a) has an average coefficient of sound absorption of about 0.487 in a frequency band more than 1800 HZ.

As a result, the comparison between the sound absorption coefficient of the test specimens reveals that the rock wool layer with a thickness of 1 centimeter and the sound-permeable PAN nanofiber layer with a patterned porosity (c), has a higher sound absorption coefficient in all frequencies, especially in low frequencies from 0 HZ to 500 HZ; therefore, it shows that the sound-permeable nanofiber layer of the test specimen (c) improves the sound absorption coefficient in all frequencies, especially in low frequencies from 0 HZ to 500 HZ; therefore, increasing the permeability in the PAN nanofiber layer improves the total sound absorbing coefficient of the sound absorbing structure.

Figure 10:
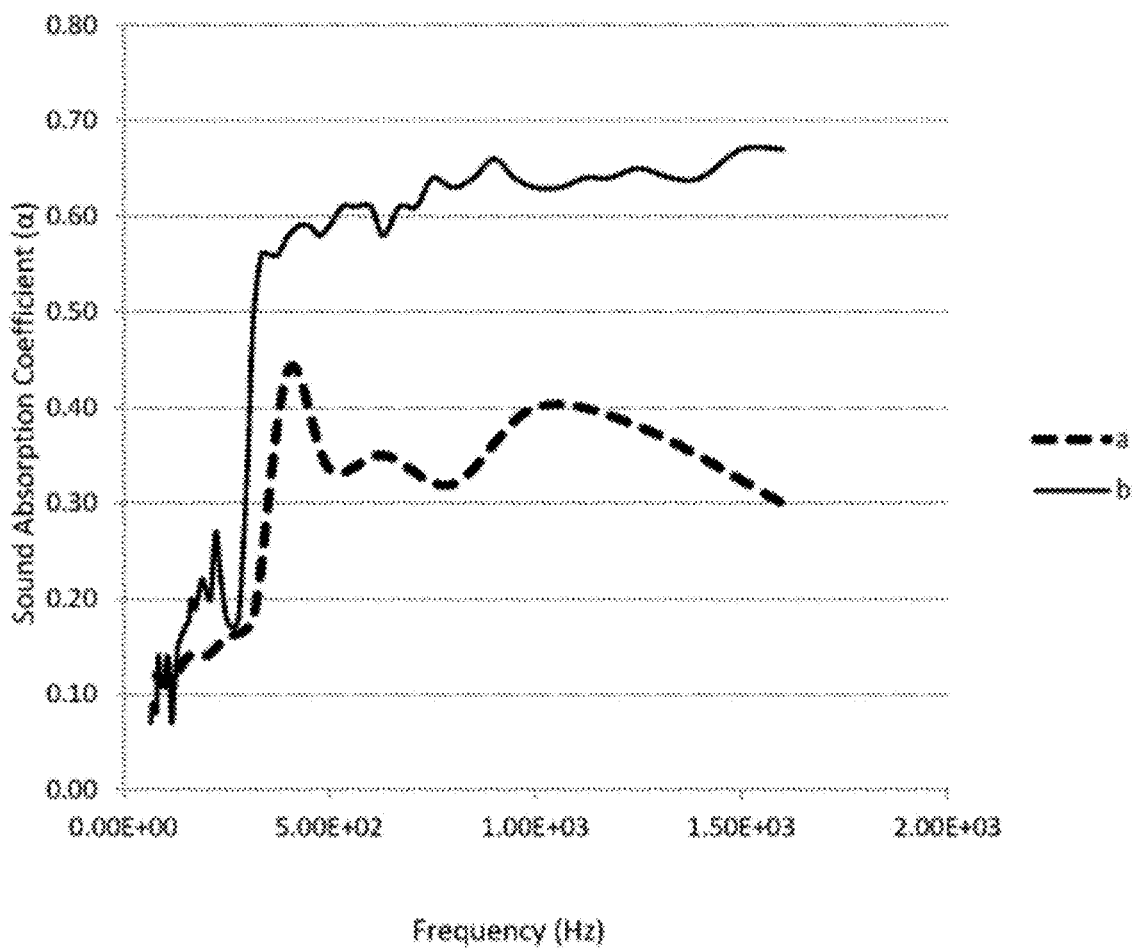
FIG. 10 illustrates the curve of sound absorption coefficient versus frequency of two test specimens: a rock wool layer with a thickness of 3 centimeter and a PAN nanofiber layer without porosity (a), and a rock wool layer with a thickness of 3 centimeter and a sound-permeable PAN nanofiber layer with a patterned porosity (b), consistent with exemplary embodiments of the present disclosure.

FIG. 10 illustrates the curve of sound absorption coefficient versus frequency of two test specimens of sound absorbing structures, including: a rock wool layer with a thickness of 3 centimeter and a PAN nanofiber layer without porosity (designated by letter "a"), and a rock wool layer with a thickness of 3 centimeter and a sound-permeable PAN nanofiber layer with a patterned porosity (designated by letter "b") which is the exemplary sound absorbing structure according to one or more aspects of the present application.

Referring to FIG. 10, a comparison between the sound absorption curves of the test specimens reveals that the rock wool layer with a thickness of 1 centimeter and the sound-permeable PAN nanofiber layer with a patterned porosity (b), has a significantly higher sound absorption coefficient; therefore, it shows that the sound-permeable nanofiber layer of the test specimen (b) improves the sound absorption coefficient in all frequencies in comparison to the rock wool layer with a thickness of 3 centimeter and the PAN nanofiber layer without porosity (a), especially in high frequency sounds. As a result, increasing the permeability in the PAN nanofiber layer improves the total sound absorbing coefficient of the sound absorbing structure.

It should be noted that thickness and weight of the sound absorbing structures are the important parameters for the sound absorption coefficients of the sound absorbing structure; and regarding that the porous PAN nanofiber layer is considerably thinner than the rock wool; therefore, there is a need to normalize the acquired sound absorption coefficients based on the thickness and weight to illustrate the real effect of the porous PAN nanofiber layer.

Figure 11:
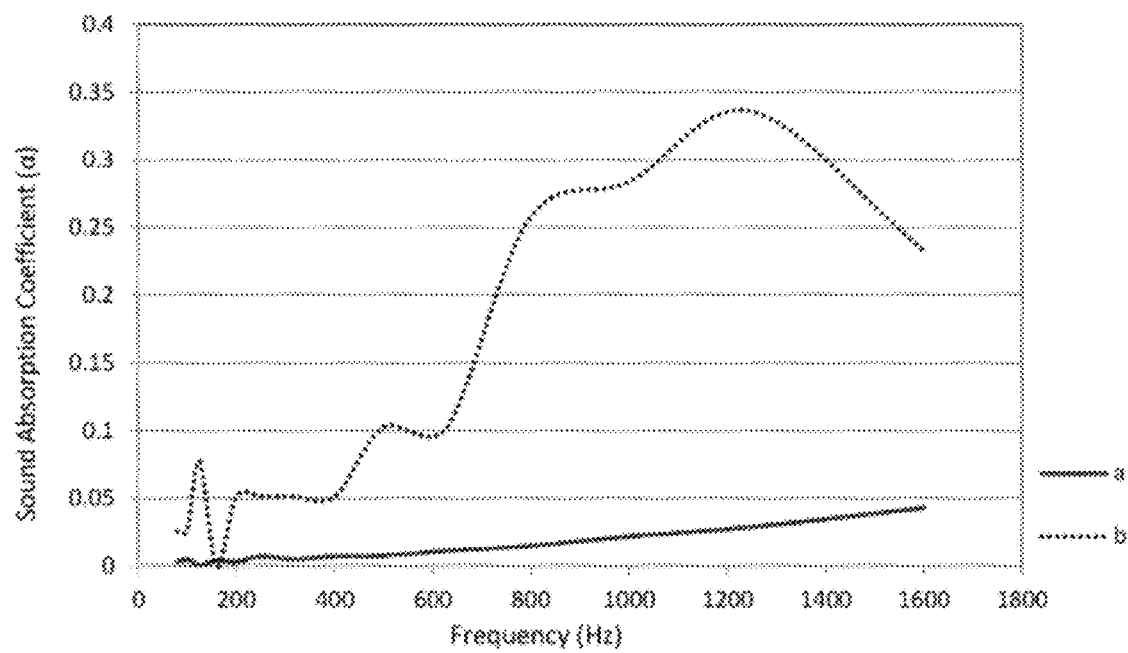
FIG. 11 illustrates a normalized sound absorption coefficient curve based on thickness for two test specimens: the rock wool with a weight equal to the weight of the sound-permeable nanofiber layer (a), and the rock wool with a weight equal to the weight of the sound-permeable nanofiber layer with the sound-permeable PAN nanofiber layer with a patterned porosity (b), consistent with exemplary embodiments of the present disclosure.

FIG. 11 illustrates a normalized sound absorption coefficient curve based on thickness for two test specimens: the rock wool with a thickness equal to the thickness of the sound-permeable nanofiber layer (designated by letter "a"), and the rock wool with a thickness equal to thickness of the sound-permeable nanofiber layer with the sound-permeable PAN nanofiber layer with a patterned porosity (designated by letter "b"), according to one or more aspects of the present application.

Referring to FIG. 11, it shows that when the results of the impedance tube sound absorption test are normalized based on the test specimens thicknesses, the effectiveness of the test specimen (b), which includes the rock wool with a thickness equal to thickness of the sound-permeable nanofiber layer with the sound-permeable PAN nanofiber layer with a patterned porosity, in sound absorption becomes much higher compared to the sample (a), which includes the rock wool with a thickness equal to the thickness of the sound-permeable nanofiber layer.

Figure 12:
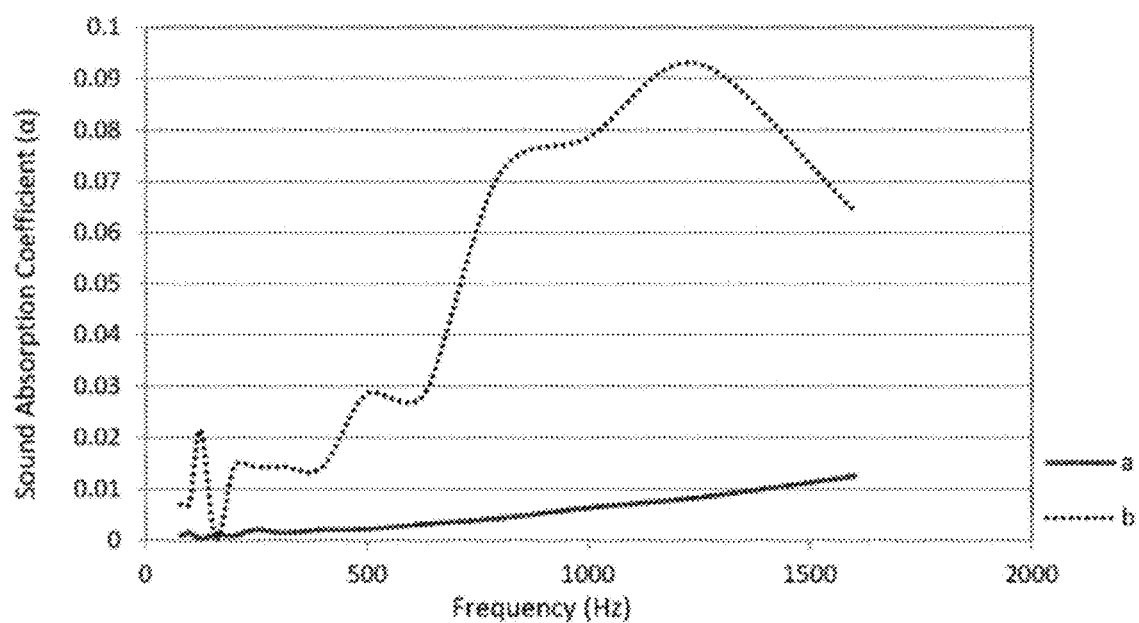
FIG. 12 illustrates a normalized sound absorption coefficient curve based on weight for two test specimens: the rock wool with a weight equal to the weight of the sound-permeable nanofiber layer (a), and the rock wool with a weight equal to the weight of the sound-permeable nanofiber layer with the sound-permeable PAN nanofiber layer with a patterned porosity (b), consistent with exemplary embodiments of the present disclosure.

FIG. 12 illustrates a normalized sound absorption coefficient curve based on weight for two test specimens: the rock wool with a weight equal to the weight of the sound-permeable nanofiber layer (designated by letter "a"), and the rock wool with a weight equal to the weight of the sound-permeable nanofiber layer with the sound-permeable PAN nanofiber layer with a patterned porosity (designated by letter "b"), according to one or more aspects of the present application.

Referring to FIG. 12, it shows that when the results of the impedance tube sound absorption test are normalized based on the test specimens weights, the effectiveness of the test specimen (b), which includes the rock wool with a weight equal to weight of the sound-permeable nanofiber layer with the sound-permeable PAN nanofiber layer with a patterned porosity, in sound absorption becomes much higher compared to the sample (a), which includes the rock wool with a weight equal to the weight of the sound-permeable nanofiber layer.

What is claimed is:

1. A sound absorbing structure, comprising:
   at least one sound-permeable nanofiber layer with first patterns, the sound-permeable nanofiber layer comprising at least one of a patterned porosity and a random porosity, the sound-permeable nanofiber layer comprising a plurality of nanofibers configured to absorb low frequency sounds with a frequency less than 1800 Hz;
   at least one sound absorbing layer directly attached to the sound-permeable nanofiber layer; and
   a patterned member directly attached to the sound absorbing layer opposite the sound-permeable nanofiber layer,
   wherein the patterned member comprises second patterns that corresponds to first patterns of the at least one sound-permeable nanofiber layer, and wherein the patterned member includes a reticulated pattern, a spotted pattern, a perforated pattern, and a stapled pattern.

2. The sound absorbing structure according to claim 1, wherein the patterned member is made of an electrical conductive, the electrical conductive comprising one of a metal material, a semi-conductor material, a non-metal material, and combinations thereof.

3. The sound absorbing structure according to claim 1, wherein the sound-permeable nanofiber layer comprises the plurality of nanofibers configured to absorb the low frequency sounds with a coefficient of sound absorption of at least 0.3.

4. The sound absorbing structure according to claim 1, wherein the patterned porosity or the random porosity is selected from the group consisting of a perforated porosity, a spotted porosity, a stapled porosity, a reticulated porosity, and combinations thereof.

5. The sound absorbing structure according to claim 1, wherein the sound-permeable nanofiber layer has a thickness of at least 1 nanometer.

6. The structure according to claim 1, wherein the sound-permeable nanofiber layer includes nanofibers with a diameter of at least 1 nanometer.

7. The structure according to claim 6, wherein the nanofibers have a cross section that is circular, trilobal, pentalobal, octalobal, elliptical, semicircular, core and shelf, porous, dumbbell-shaped, hollow fibers, or diamond-shaped.

8. The structure according to claim 1, wherein the sound-permeable nanofiber layer is made of polymers, ceramics, nanostructures, metals, or combinations thereof.

9. The structure according to claim 8, wherein the polymers are one of natural polymers, artificial polymers, copolymers, polyacrylonitrile (PAN), polyamide, polyester, polyethylene terephthalate (PET), cellulose acetate, Nylon 6 (PA6), Nylon 6-6, polyurethane (PU), polycarbonate (PC), polyvinyl alcohol (PVA), poly lactic acid (PLA), polyethylene oxide (PEO), polystyrene (PS), polyethylene methacrylate (PMMA), polyvinyl phenol (PVP), polyvinyl chloride (PVC), cellulose acetate (CA), PLGA, collagen, poly caprolactone (PCL), poly caprolactam, silicon rubber, and combinations thereof.

10. The structure according to claim 8, wherein the nanostructures are one of carbon nanotube (CNT), nanoclay, nanosilica, titanium dioxide, iron(III) oxide, graphene oxide nanoparticles, gold nanoparticles, silver nanoparticles, and combinations thereof.

11. The structure according to claim 8, wherein the ceramics are one of oxides, nitrides, carbides, and combinations thereof.

12. The structure according to claim 8, wherein the metals are one of silver, gold, iron, tungsten, and combinations thereof.

13. The sound absorbing structure according to claim 1, wherein the sound absorbing layer is made of rock wool, glass wool, foam, cloth, paper, wood, metal, and combinations thereof.

14. The sound absorbing structure according to claim 1, wherein the sound absorbing layer comprises a non-woven fabric, a woven fabric, a knitted fabric, a spun-bonded fabric, a melt-blown fabric, a needle-punched fabric, an apertured web, a split film web, a hydro-entangled web, an adhesive-backed web, an air-laid staple fiber web, an elastic fabric web, a mesh, a porous web, or combinations thereof.

15. The sound absorbing structure according to claim 1, wherein the sound absorbing layer has a thickness of at least 1 nanometer.

16. A method for fabricating a sound absorbing structure, comprising:
    providing a sound absorbing layer;
    attaching an electroconductive patterned member to the sound absorbing layer; and
    electrospinning a plurality of nanofibers directly on the sound absorbing layer or on the electroconductive patterned member to form a sound-permeable nanofiber layer with a patterned porosity corresponding to a pattern of the electroconductive patterned member.

17. The method according to claim 16, wherein the plurality of nanofibers are synthesized through an electrostatic spinning process, which is selected from the group consisting of bubble electrospinning, melt electrospinning, magnetic electrospinning, nozzle-less electrospinning, centrifugal electrospinning, coaxial electrospinning, classic electrospinning, gas jacket electrospinning, continuous electrospinning, and combinations thereof.

18. A method for fabricating a sound absorbing structure, comprising:
    providing a sound absorbing layer;
    depositing a plurality of nanofibers on the sound absorbing layer to form a nanofiber layer attached to the sound absorbing layer;
    increasing the sound permeability of the nanofiber layer to form a sound-permeable nanofiber layer attached to the sound absorbing layer; and
    directly attaching a patterned member to the sound absorbing layer opposite the sound-permeable nanofiber layer.

19. The method according to claim 18, wherein the plurality of nanofibers are synthesized through one of electrostatic spinning, force spinning, phase separation, flash spinning, self-assembly, template synthesis, sol-gel, matrix/fibril, wet spinning, interfacial spinning, electrospinning, and combinations thereof.

20. The method according to claim 18, wherein the plurality of nanofibers are synthesized through one of bubble electrospinning, melt electrospinning, magnetic electrospinning, nozzle-less electrospinning, centrifugal electrospinning, coaxial electrospinning, classic electrospinning, gas jacket electrospinning, continuous electrospinning, and combinations thereof.

21. The method according to claim 18, wherein the sound permeability of the nanofiber layer is increased during the nanofiber layer formation, or after the nanofiber layer formation, or combinations thereof.

22. The method according to claim 21, wherein the sound permeability of the nanofiber is increased during the formation of the nanofiber layer through formation of the nanofiber layer with two different types of nanofibers and subsequently removing one type of the nanofibers, formation of the nanofiber layer in a three-dimensional manner by using nanoparticles and micro particles, formation of the nanofiber layer by using nanofibers with different diameters, salt bleaching method, collecting the synthesized nanofibers far away each other, and combinations thereof.

23. The method according to claim 21, wherein the sound permeability of the nanofiber is increased after the formation of the nanofiber layer through using an ultrasonic device, using a laser light radiation device, or combinations thereof.

* * * * *